DATA FIELD TRANSFER APPARATUS

Filed March 29, 1968

INVENTOR.
LAWRENCE G. HANSON
BY
Christie, Parker & Hale
ATTORNEYS

Jan. 5, 1971 L. G. HANSON 3,553,652

DATA FIELD TRANSFER APPARATUS

Filed March 29, 1968 3 Sheets-Sheet 2

INVENTOR
LAWRENCE G. HANSON

Christie, Parker & Hale
ATTORNEYS

INVENTOR.
LAWRENCE G. HANSON
BY
Christie, Parker & Hale
ATTORNEYS

United States Patent Office 3,553,652
Patented Jan. 5, 1971

3,553,652

DATA FIELD TRANSFER APPARATUS

Lawrence G. Hanson, Temple City, Calif., assignor to Burroughs Corporation, Detroit, Mich., a corporation of Michigan Filed Mar. 29, 1968, Ser. No. 717,291
Int. Cl. G06f 7/00
U.S. Cl. 340—172.5 13 Claims

ABSTRACT OF THE DISCLOSURE

A field of digital data is transferred in parallel from one position in a source storage register to a different position in a destination storage register. An output line is provided for each digit place of the source register. The output lines are offset a number of digit places equal to the lateral displacement between the source and destination positions. The offset lines on both sides of the destination position are masked off and the remaining lines, which transmit the transferred data field, are coupled to the destination register. A specific application of this apparatus is disclosed in which a field of data in a computer memory transversing one or more cell boundaries is transferred in a high speed operation. One word at a time of the source field is read from the computer memory into the source register. A portion of the word at one boundary of the source field is transferred to the position of a portion of the cell in the destination field. Similarly, the portions of the source field from each word are in turn transferred to the cells of the destination field.

BACKGROUND OF THE INVENTION

This invention relates to digital data handling and, more particularly, to apparatus for transferring a field of digital information from one position to another.

In a digital computer there are many operations that require the transfer of a field of digital data stored in a register to a different position in the same or a different register. Such a transfer must also be executed in other data handling applications than computers. The conventional way to transfer a field of data from one position to another is to shift it serially. The term "shift" is commonly used in a broad sense to include a rotation operation. In a rotation operation the bits displaced out of one end of the register are placed into the digit places at the other end. When it is used in a narrow sense, the term shift describes an operation in which the bits displaced out of the digit places at one end are discarded and bits having the value "0" are placed into the digit places at the other end. By serially is meant that the transfer proceeds a digit place at a time. The time required to execute a transfer of data in and out of the registers in this fashion is directly related to the number of digit places in the registers. Thus, the execution time may become prohibitive in a data handling system that has large registers and deals with data words having many digit places.

SUMMARY OF THE INVENTION

The invention contemplates the transfer of data fields in parallel from one position in a register to another position in the same or a different register. By transferring the data fields in parallel, the execution time of the transfer is independent of the number of digit places in the data words being handled.

In particular an output line for each digit place is provided from a source register. These output lines are offset by a number of digit places equal to the lateral displacement between the source and destination field positions. The offset lines outside of the destination field position are masked off and the remaining offset lines are coupled to the destination register.

According to a feature of the invention, a data field that traverses cell boundaries in a computer memory is transferred to a different position in the memory by the above described apparatus. The words from the cells at the source position are coupled in turn to the source register, while the cells at the destination position are coupled in turn to the destination register. After the data from the source position in a cell is completely transferred to the destination register, the next adjacent cell is coupled to the source register. Similarly, after transferred data completely occupies the portion of the destination register corresponding to the portion of the destination position in a cell, the contents of the destination register is transferred to the cell in the memory. This procedure is continued until the entire field is transferred from the one memory position to the other.

BRIEF DESCRIPTION OF THE DRAWINGS

The features of a specific embodiment of the invention are illustrated in the drawings, in which.

DESCRIPTION OF A SPECIFIC EMBODIMENT

Figure 1:
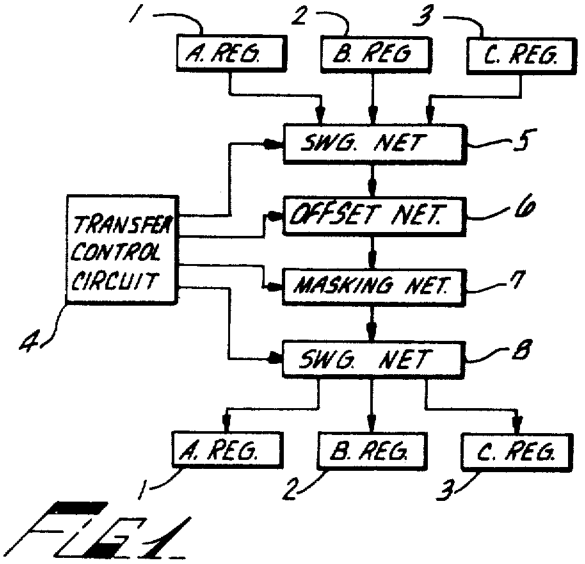
FIG. 1 is a schematic block diagram of a digital computer with field transfer circuitry that incorporates the principles of the invention.

In FIG. 1 an A register 1, a B register 2 and a C register 3 are shown. A field of data is transferred from one position in register 1, 2, or 3 to a different position in the same or a different one of registers 1, 2, or 3 under the supervision of a transfer control circuit 4. Registers 1, 2, and 3 are selectively coupled through a switching network 5 to an offset network 6 and a masking network 7. Networks 6 and 7 transfer a data field having a length determined by transfer control circuit 4 to a new position determined by transfer control circuit 4. Masking network 7 is selectively coupled through a switching network 8 to one of registers 1, 2, or 3. Transfer control circuit 4 determines which of registers 1, 2, or 3 is the source register, i.e. the register coupled through switching network 5 to offset network 6, and which of registers 1, 2, or 3 is the destination register, i.e. the register coupled through switching network 8 to masking network 7. Although registers 1, 2 and 3 have as many output lines and input lines as digit places, these lines are represented collectively in FIG. 1 by single lines. Similarly, the lines connecting switching network 5, offset network 6, masking network 7, and switching network 8 are represented collectively as single lines although there are in fact as many lines as the number of digit places in registers 1, 2 and 3.

Figures 4, 5:
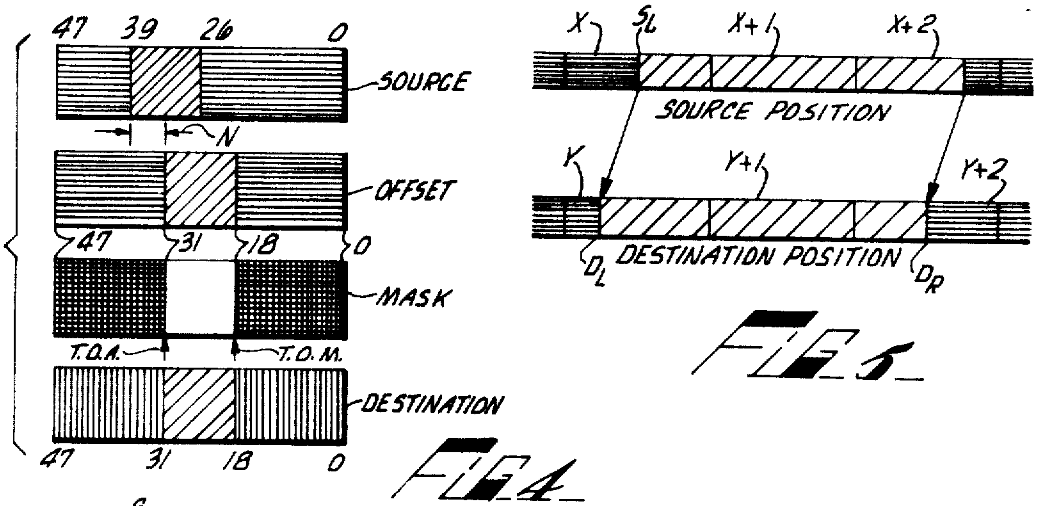
FIG. 4 is a diagram of the operation carried out by the apparatus of FIG. 1.
FIG. 5 is a diagram depicting the transfer of the position of a data field that traverses two cell boundaries in a computer memory.

Reference is now made to FIG. 4 for a description of the mode of operation of the apparatus of FIG. 1 by means of a specific example. The data is handled by the apparatus in FIG. 1 on a parallel basis, i.e., the digits forming the data are transmitted through the apparatus simultaneously. Four rectangles are depicted that represent the data handled by the apparatus of FIG. 1 at different stages of the operation. For the purpose of discussion, it is assumed that the data is in binary form and forms a row of forty-eight digit places that are designated 0 through 47. The least significant digit place is designated 0 and the most significant digit place is designated 47. A source of data that has a field to be transferred with a length of fourteen digit places is represented by the top rectangle in FIG. 4. The source position of the data field to be transferred is a row of digit places 26 through 39. The data occupying digit places 0 through 25 and 40 through 47 are not to be transferred with the data field. As represented by the bottom rectangle in FIG. 4, the destination position of the data field to be transferred is a row of digit places 18 through 31. In transferring the data field to the destination position, the data occupying digit places 0 through 17 and 32 through 47 is not to be destroyed. To effect the transfer of the data field, all the source data is first offset a number of digit places N equal to the lateral displacement between the source and destination positions. This is accomplished in FIG. 1 by offset network 6. As illustrated by the second rectangle from the top in FIG. 4, the source data is offset to the right eight digit places in the exemplary case. Then, a mask is formed to block out the digit places on both sides of the destination position, while transmitting the data in the digit places within the destination position. The values of two parameters, namely, the top of aperture and the top of mask, determine the digit places that are transmitted through the mask. When the top of aperture is larger than the top of mask, the data in all the digit places below and inclusive of the top of aperture value and all the digit places above and exclusive of top of mask value are transmitted through the mask, while the other digit places are masked off. This is the situation depicted by the second rectangle from the bottom in FIG. 4. The top of aperture is 31 and the top of mask is 17. Accordingly, a data field from digit place 18 through digit place 31 is transmitted through the mask. When the top of mask value is equal to or larger than the top of aperture value, the data in digit places that is above and exclusive of the top of mask value and the digit places below and inclusive of the top of aperture value are transmitted through the mask. If the top of mask were 31 and the top of aperture were 18, the complement of the mask illustrated in FIG. 4 would result. In other words, the data in digit places 0 through 18 and 32 through 47 would be transmitted through the mask.

Figure 2:
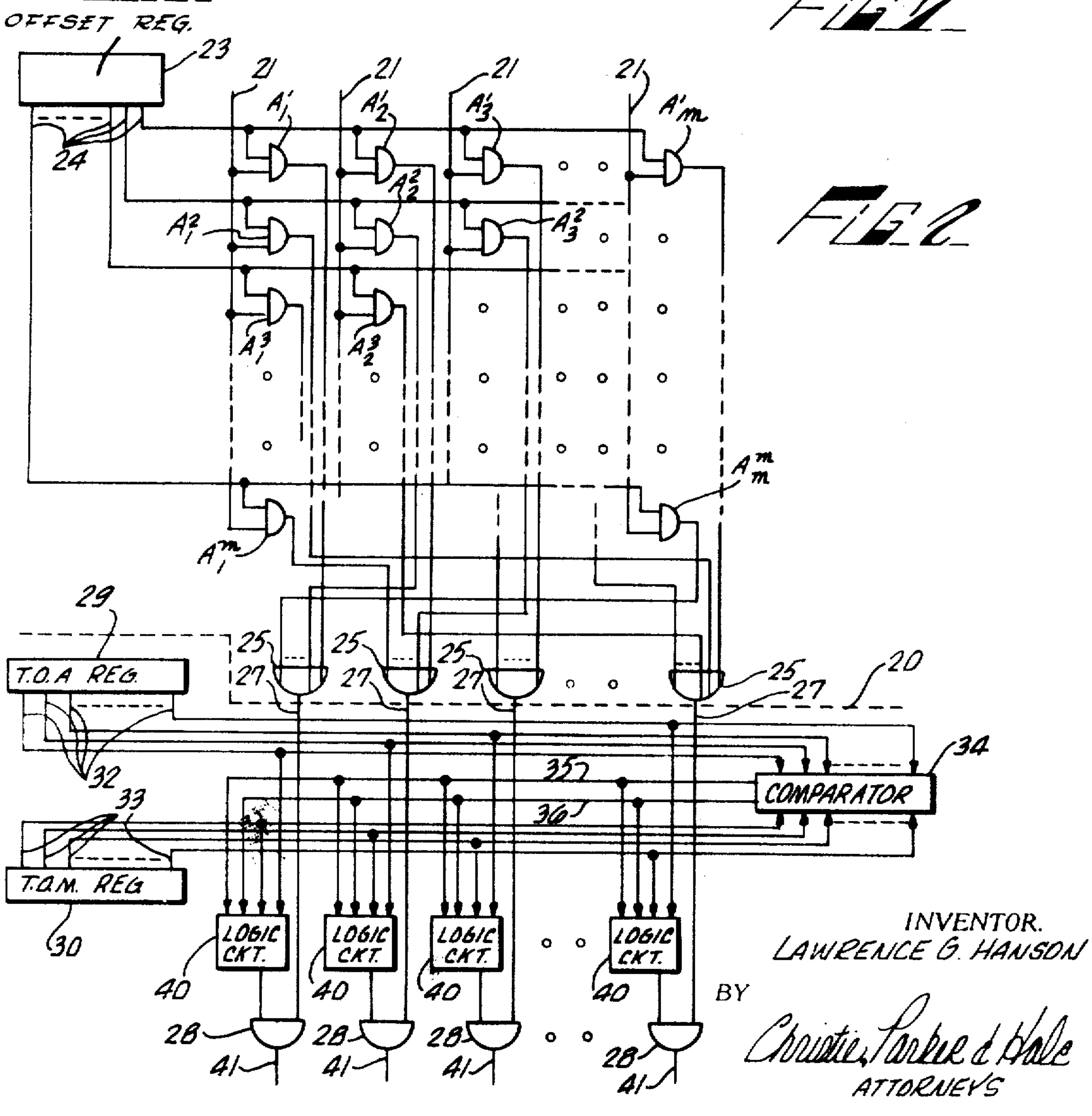
FIG. 2 is a schematic diagram in detail of the offset network and the masking network of FIG. 1.

In FIG. 2 offset network 6 and masking network 7 are shown in more detail. Offset network 6 lies above an imaginary dashed line 20 and masking network 7 lies below line 20. Offset network 6 includes a matrix arranged electrically in a number of vertical columns equal to the number of digit places in registers 1, 2, and 3 and the same number of horizontal rows. An AND gate is located at each intersection of the matrix. These AND gates are designated "A" in FIG. 2, each with a superscript identifying the horizontal row (numbering from top to bottom) and a subscript identifying the vertical column (numbering from left to right) in which it is located. For example the AND gate in the upper left hand corner of the matrix is $A_1^1$, and the AND gate in the lower right hand corners of the matrix is $A_m^m$, where $m$ is the number of rows and columns. Each of data transmission lines 21 from switching network 5 is connected to one input of all the AND gates in a different vertical column of the matrix. The value of the offset to be introduced into output lines 21 is stored in an offset register 23 that has output lines 24. Each of output lines 24 is connected to one input of all the AND gates in a different horizontal row of the matrix. An OR circuit 25 is provided for each vertical column of the matrix. The outputs of the AND gates are connected to the inputs of OR gates 25 in the same groupings as the coefficients of a determinant appear in positive polarity terms of its expansion. In other words the outputs of the following $m$ AND gates are connected to OR gate 25 located on the extreme left in FIG. 2: $A_1^1$, $A_2^2$, $A_3^3$, . . . $A_m^m$. The outputs of the following $m$ AND gates are connected to the second OR gate 25 from the left: $A_2^1$, $A_3^2$, $A_4^3$, . . . $A_1^m$. The outputs of the following $m$ AND gates are connected to the third OR gate 25 from the left: $A_3^1$, $A_4^2$, . . . $A_1^{m-1}$, $A_2^m$. The outputs of the following $m$ AND gates are connected to OR gate 25 on the extreme right: $A_m^1$, $A_1^2$, $A_2^3$ . . . $A_{m-1}^m$. Offset lines 27 connect OR gates 25 masking network 7. One of lines 24 is energized depending upon the value of the offset N to be introduced. Thus, if the lead 24 emanating from offset register 23 on the extreme right is energized, the data transmitted by lines 21 is coupled through the top horizontal row of AND gates (i.e., $A_1^1$, $A_2^1$, $A_3^1$ . . . $A_m^1$) and through OR gates 25 to lines 27 without any offset, i.e., without any lateral displacement in the digit places of the data. If the second line 24 from the right emanating from offset register 23 is energized, the data on lines 21 is coupled through the second horizontal row of AND gates from the top (i.e., $A_1^2$, $A_2^2$, $A_3^2$ . . . $A_m^2$) and through OR gates 25 to lines 27 offset by one digit place to the left. Therefore, the binary value transmitted by the left hand line 21 is transmitted to the right hand line 27; the binary value transmitted by the second line 21 from the left is transmitted to the left hand line 27; the binary value transmitted by the third line 21 from the left is transmitted to the second line 27 from the left; and so forth. Therefore, the offset lines 27 produce a rotated version of the data supplied on data transmission lines 21; that is, each bit supplied on a data transmission line 27 has been rotated to the left by one line. Equivalently, it can be said that each bit has been rotated to the right by $m-1$ lines. If the left hand line 24 emanating from offset register 23 is energized, lines 21 are coupled through the bottom horizontal row of AND gates (i.e., $A_1^m$, $A_2^m$, $A_3^m$ . . . $A_m^m$) and through OR gates 25 to lines 27 offset by one digit place to the right. In this case, the binary value transmitted by the right hand line 21 is transmitted to the left hand line 27; the binary value transmitted by the left hand line 21 is transmitted to the second line 27 from the left; the binary value transmitted by the second line 21 from the left is transmitted to the third line 27 from the left; and so forth. Similarly by energizing a particular line 24, the data transmitted by lines 21 can be offset by any number of digit places.

Masking network 7 has a number of AND gates 28 equal to the number of digit places in registers 1, 2, and 3. The offset data at the output of OR gates 25 is coupled by lines 27 to one input of AND gates 28. The values stored in a top of aperture register 29 and a top of mask register 30 determine the digit places of the offset data that are coupled through AND gates 28. Registers 29 and 30 have a number of output lines 32 and 33, respectively, equal to the number of digit places in registers 1, 2 and 3. The number of output lines from register 29 and 30 that is energized depends upon the value stored in the register. In any case, the energized output lines of registers 29 and 30 correspond to consecutive digit places of lines 27 starting with the least significant digit place. For example, if the value stored in register 29 or 30 is ten, then the output lines of the register corresponding to the first ten digit places are energized. Output lines 32 and 33 are coupled to a comparator 34. If the top of aperture value is larger than the top of mask value, a bus 35 is energized. If the top of mask value is equal to or larger than the top of aperture value, a bus 36 is energized. A number of identical logic circuits 40 equal to the number of digit places in registers 1, 2, and 3 control the transmission of the offset data through AND gates 28. Busses 35 and 36 are connected to each of logic circuits 40. Each of output lines 32 and 33 is connected to logic circuit 40 corresponding to the same digit place of line 27 as the output line. Each of logic circuits 40 is in turn coupled to the corresponding AND circuit 28. Responsive to the binary state of lines 32 and lines 33, and busses 35 and 36, logic circuits 40 corresponding to the digit places of the destination position are energized to enable the corresponding AND gates 28. Consequently, the portion of the offset data within the field to be transferred is coupled by AND gates 28 to lines 41, which are connected to switching network 8 (FIG. 1).

Figure 7:
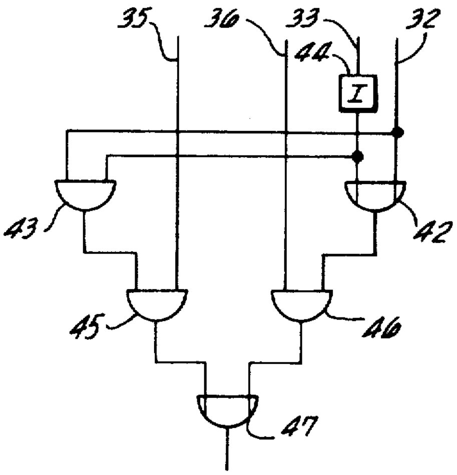
FIG. 7 is a schematic diagram of a logic circuit represented in FIG. 2 as a block.

In FIG. 7 one of logic circuits 40 is shown in detail. Output lead 32 of the corresponding digit place is connected to one input of an OR gate 42 and one input of an AND gate 43. Output lead 33 of the corresponding digit place is connected through an inverter 44 to the other input of OR gate 42 and the other input of AND gate 43. Bus 35 is connected to one input of an AND gate 45 and bus 36 is connected to one input of an AND gate 46. The outputs of AND gate 43 and OR gate 42 are connected to the other input of AND gate 45 and AND gate 46, respectively. The outputs of AND gates 45 and 46 are coupled through an OR gate 47 to AND gate 28 (FIG. 2) of the corresponding digit place. AND gates 45 and 46 operate on an alternative basis.

If the top of aperture value is larger than the top of mask value, bus 35 enables AND gate 45. In this case AND gate 43 determines whether the logic circuit is energized. If both inputs to AND gate 43 of a particular logic circuit are energized, then that logic circuit becomes energized. Thus, the logic circuits corresponding to the digit places from and including the top of aperture to and excluding the top of mask are energized.

If the top of mask value is equal to or larger than the top of aperture value, bus 36 enables AND gate 46. In this case, OR circuit 42 determines whether a logic circuit is energized. If either input to OR gate 42 is energized, then that logic circuit 40 is energized. As a result, the logic circuits corresponding to the digit places above and excluding the top of mask and the digit places below and including the top of aperture are energized.

The apparatus disclosed in FIGS. 1 and 2 can be employed to perform innumerable operations. In each case, transfer control circuit 4 (FIG. 1) provides the offset value to register 23, the top of aperture value to register 29, and the top of mask value to register 30 (FIG. 2). Transfer control circuit 4 could include a digital computer that functions with the field transfer apparatus. In particular, the computer would provide instructions from which the offset, top of aperture, and top of mask values are derived and the field transfer apparatus would execute the field transfer responsive to the instruction.

One function that the field transfer apparatus is capable of performing is the transfer of a field of data that traverses cell boundaries in a computer memory from one position in memory to another. This function is illustrated graphically in FIG. 5. A data field is depicted in a source position that occupies part of a memory cell X. all of a memory cell $X+1$ and part of a memory cell $X+2$. The lefthand boundary of the source position is located at the digit place of cell X designated $S_L$. As indicated by the arrows in FIG. 5, the field in the source position is moved to a destination position that occupies part of a memory cell Y, all of a memory cell $Y+1$ and part of a memory cell $Y+2$. The lefthand boundary of the destination position is located at the digit place in cell Y designated $D_L$ and the righthand boundary of the destination position is located at the digit place in cell $Y+2$ designated $D_R$.

FIGS. 6A through 6F depict the steps involved in transferring the data field from the source position to the destination position in memory with the field transfer apparatus of FIG. 1. Each of FIGS. 6A through 6F has three rectangles. The top rectangle represents the data in the source register, the middle rectangle represents the field transfer apparatus, and the bottom rectangle represents the data in the destination register. The shaded areas in the rectangles marked with the oblique lines represent the field to be transferred and the shaded areas in the rectangles marked with the horizontal lines represent the data outside of the field. As illustrated in FIG. 5, the destination position of the field is displaced to the left of the source position by a number of digit places equal to the difference between $D_L$ and $S_L$. It is assumed the significance of the digit places increases from right to left and that each cell has 48 digit places. Therefore the value of the offset stored in register 23 (FIG. 2) is N, i.e., the absolute value of the difference between $D_L$ and $S_L$. If the destination position were displaced laterally to the right of the source position, the offset value placed in register 23 would be 47—N.

Figure 6A:
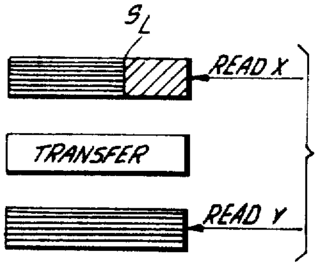
FIGS. 6A through 6F are diagrams of the operations that are carried out to transfer the position of the data field in FIG. 5.

The first step in transferring the field in FIG. 5 from the source position to the destination position is to read the word in memory cell X into register 1 and the word in memory cell Y into register 2, as depicted in FIG. 6A.

Figure 6B:
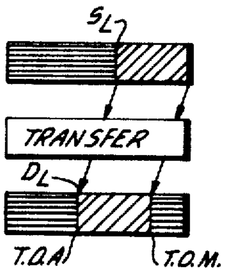

The second step is to transfer the portion of the field in register 1 to register 2. In executing this transfer, the portion of the field is displaced to the left N digit places. As depicted in FIG. 6B, the top of aperture value is $D_L$ and the top of mask value is N. Thus, only the portion of the field in register 1 is actually transferred to register 2 and the remaining part of the original contents of register 2 is undisturbed.

Figure 6C:
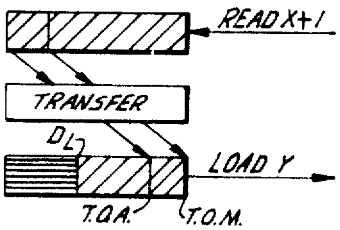

The third step is to read the word in memory cell $X+1$ into register 1 and to transfer a sufficient portion of the field in register 1 to fill up the space in register 2 remaining to the right of the portion of the field transferred in the second step. This is depicted in FIG. 6C. The transferred portion of the field in register 1 is offset N digit places. The top of aperture value is the same as the top of mask value during the preceding step, namely N, and the top of mask value is zero. As a result, the original contents of memory cell Y to the left of digit place $D_L$ and the portion of the field transferred to register 2 in the second step remain undisturbed as the transfer takes place. At this point, the portion of the destination position in memory cell Y is completely filled, so the contents of register 2 are loaded into cell Y.

Figure 6D:
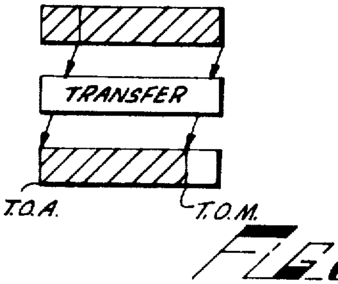

The fourth step is to transfer the remaining portion of the field in register 1 to register 2, as depicted in FIG. 6D. In transferring this portion of the field, it is displaced N digit places. The top of aperture value is 47 and the top of mask value is N.

Figure 6E:
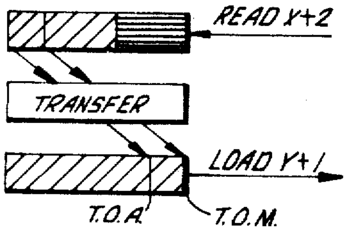

The fifth step is to read the word in memory cell $X+2$ into register 1 and to transfer a sufficient portion of the field in register 1 to fill up the space in register 2 remaining to the right of the field transferred in the fourth step, as depicted in FIG. 6E. The transferred portion of the field is displaced laterally N digit places. The top of aperture value is the top of mask value in the preceding step, namely N, and the top of mask value is zero. After this transfer, register 2 is completely occupied by data. Therefore, the contents of register 2 are loaded into memory cell $Y+1$.

Figure 6F:
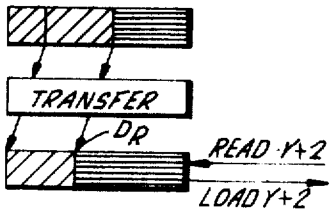

The sixth step is to read the word in cell $Y+2$ into register 2 and to transfer the final portion of the field to register 2, as depicted in FIG. 6F. This portion is displaced laterally N digit places. The top of aperture value is 47 and the top of mask value is $D_R$. Thus, the original contents of register 2 to the right of digit place $D_R$ remain undisturbed and are loaded into memory cell $Y+2$ with the final portion of the field.

It should be noted that the contents of cells Y and $Y+2$ are loaded into register 2 before any of the data field to be stored in these cells is transferred to register 2. The purpose of this is to preserve the original contents of cells Y and $Y+2$ on either side of the desination position. In the case of cell $Y+1$, none of the original data is preserved. Accordingly, the contents of cell $Y+1$ are not read into register 2 before the portion of the data field to be stored in cell $Y+1$ is transferred to register 2.

Figure 3:
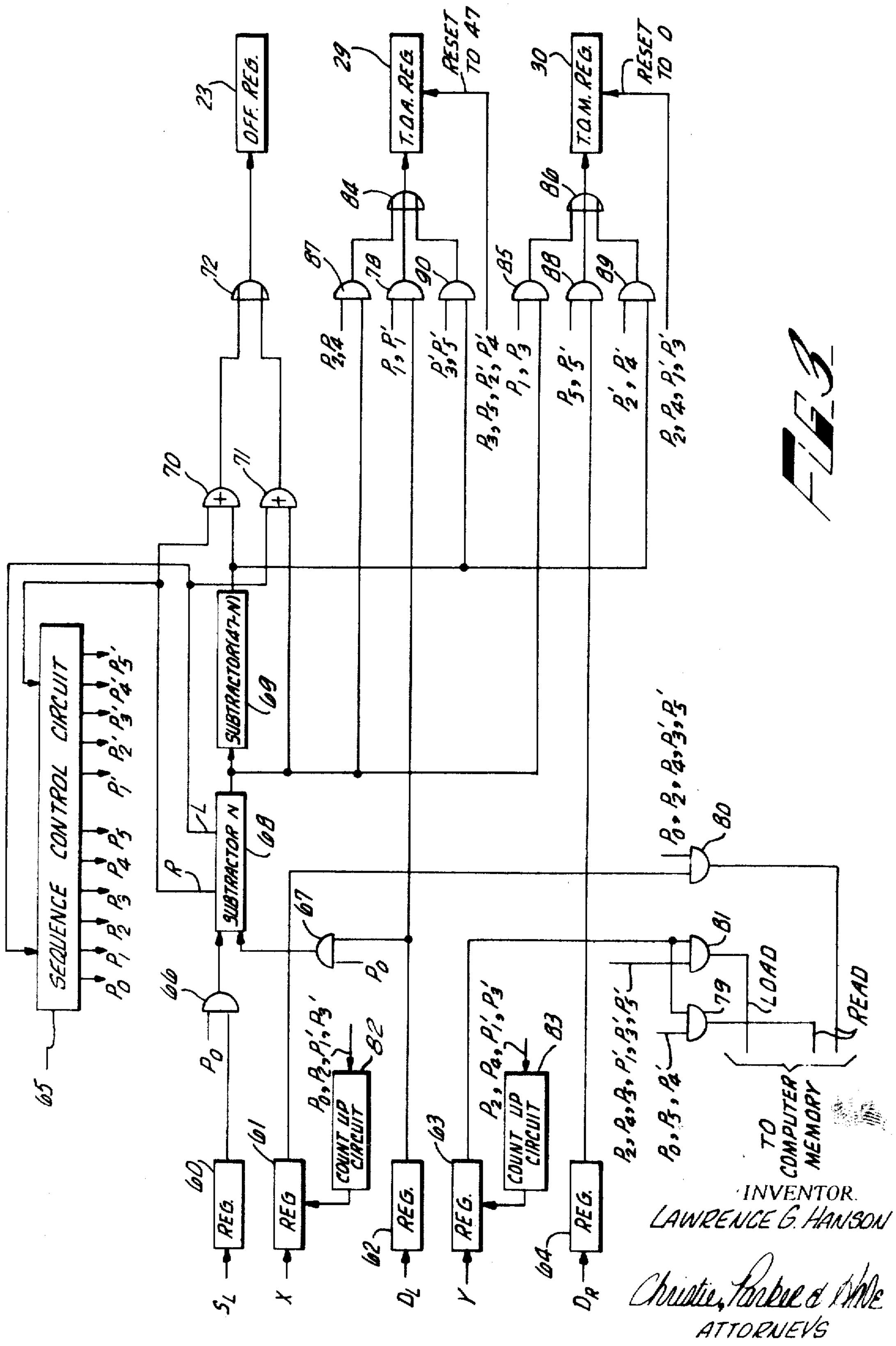
FIG. 3 is a schematic diagram of the control circuit of FIG. 1 required to carry out the transfer of the position of a field traversing two cell boundaries of a computer memory.

In FIG. 3, an arrangement is shown that functions as transfer control circuit 4 (FIG. 1) to execute the operation depicted in FIG. 5 and FIGS. 6A through 6F. The arrangement of FIG. 3 is intended to function with a digital computer. Specifically, the parameters $S_L$, X, $D_L$, Y, and $D_R$ which are either contained in the computer instruction to execute the field transfer operation or derived from this instruction by the computer, are loaded into registers 60, 61, 62, 63, and 64, respectively. The values that must be loaded into offset register 23, top of aperture register 29 and top of mast register 30 (FIG. 2) in order to carry out the field transfer between the described memory locations are derived from these parameters. The execution of the six steps in the sequence described in connection with FIGS. 6A through 6F is controlled by pulses produced by a sequence control circuit 65. Sequence control circuit 65 has leads $P_0$ through $P_5$ and $P_1'$ through $P_5'$. Upon the initiation of the sequence responsive to a field transfer operator in the computer instruction, lead $P_0$ is first energized. Thereafter, either leads $P_1$ through $P_5$ or leads $P_1'$ through $P_5'$ are energized in succession at intervals of time determined by a timing source that could be the master clock of the computer. It is assumed that the computer memory read operation takes place at the beginning of the intervals and the computer memory write operation takes place at the end of the intervals. Countup circuits 82 and 83 advance by one the value stored in registers 61 and 63, respectively, when they are actuated. A delay is built into these countup circuits so they operate after the write operation in an interval.

When lead $P_0$ is energized, AND gates 66 and 67 are enabled. As a result, the value of $S_L$ in register 60 and the value of $D_L$ in register 62 are transmitted to a subtractor 68 that produces the difference between $S_L$ and $D_L$, namely N. Subtractor 68 also designates whether the displacement of the data field from the source position to the destination position is to the right or to the left. If the displacement is to the left, indicating that $D_L$ is larger than $S_L$, lead L is energized and the sequence $P_1$ through $P_5$ follows. If the displacement is to the right, indicating that $S_L$ is larger than $D_L$, lead R is energized and the sequence $P_1'$ through $P_5'$ follows. The difference N produced by subtractor 68 is coupled to a subtractor 69 that produces the difference 47—$N$. The output of subtractor 69 and lead R are coupled to the inputs of an AND gate 70 and the output of subtractor 68 and lead L are coupled to the inputs of an AND gate 71. Accordingly, if the displacement from the source position to the destination position is to the left, the value N is coupled through an OR gate 72 to offset register 23. On the other hand, if the displacement from the source position to the destination position is to the right, the value 47—$N$ is coupled through OR gate 72 to offset register 23. Lead $P_0$ also enables AND gates 80 and 79 to couple the address values of cells X and Y, respectively, to the computer memory. The data words in cells X and Y are then read from the computer memory by conventional means and loaded into registers 1 and 2 respectively (not shown in FIG. 3). Lead $P_0$ is also connected to countup circuit 82 for register 61. Thus, after the contents of cell X is read, the address value in register 61 is advanced by one so it designates cell $X+1$.

Assuming first that $D_L$ is larger than $S_L$, the sequence $P_1$ through $P_5$ is initiated responsive to the energization of lead L. When lead $P_1$ is energized, the value of $D_L$ in register 62 is coupled through an AND gate 78 and an OR gate 84 to top of aperture register 29. At the same time, the value of N is coupled from subtractor 68 through an AND gate 85 and an OR gate 86 to top of mask register 30. Consequently, the field transfer depicted in FIG. 6B takes place.

When lead $P_2$ is energized, the value of N is coupled from subtractor 68 through an AND gate 87 and OR gate 84 to top of aperture register 29 and top of mask register 30 is reset to zero. The address value of cell $X+1$ is also coupled through AND gate 80 to the computer memory so the contents of cell $X+1$ are read from the computer memory and loaded into register 1. Then, the field transfer operation depicted in FIG. 6C is carried out and the address value of cell Y stored in register 63 is coupled through AND gate 81 to the computer memory. As a result, the contents of register 2 are loaded into cell Y of the computer memory. Thereafter, countup circuit 82 is energized to advance the value in register 61 to $X+2$, and countup circuit 83 is energized to advance the value in register 63 to $Y+1$.

When lead $P_3$ is energized, top of aperture register 29 is reset to 47 and the value of N from subtractor 68 is coupled through AND gate 85 and OR gate 86 to top of mask register 30. Thus, the field transfer operation depicted in FIG. 6D is carried out.

When lead $P_4$ is energized, the value of N from subtractor 68 is coupled through AND gate 87 and OR gate 84 to top of aperture register 29 and top of mask register 30 is reset to zero. In addition, the address value of cell $X+2$ in register 61 is coupled through AND gate 80 to the computer memory so the contents of cell $X+2$ are read out of the computer memory and loaded into register 1. Then the field transfer operation depicted in FIG. 6E is carried out and the address value of cell $Y+1$ in register 63 is coupled through AND gate 81 to the computer memory. As a result, the contents of register 2 are loaded into cell $Y+1$ of the computer memory. Thereafter countup circuit 83 is energized to advance the value in register 63 to $Y+2$.

When lead $P_5$ is energized, top of aperture register 29 is reset to 47 and the value of $D_R$ from register 64 is coupled through an AND gate 88 and OR gate 86 to top of mask register 30. In addition, the address value of cell $Y+2$ is coupled through AND gate 79 to the computer memory so the contents of cell $Y+2$ are read out of the computer memory and loaded into register 2. Then the field transfer operation depicted in FIG. 6F is carried out and the address value of cell $Y+2$ stored in register 63 is coupled through AND gate 81 to the computer memory. As a result, the contents of register 2 are loaded into memory cell $Y+2$ of the computer memory. This completes the transfer.

Assuming next that $S_L$ is larger than or equal to $D_L$, the sequence $P_1'$ through $P_5'$ is initiated responsive to the energization of lead R. In this transfer, the field would be displaced laterally to the right as viewed in FIG. 5. When lead $P_1'$ is energized, the value $D_L$ from register 62 is coupled through AND gate 78 and OR gate 84 to top of aperture register 29 and top of mask register 30 is reset to zero. This field transfer operation fills the allotted digit places of the destination position in cell Y. Thus, the address value of cell Y is coupled from register 63 through AND gate 81 to the computer memory so the contents of register 2 are loaded into cell Y. Thereafter countup circuit 82 is energized to advance the value in register 61 to $X+1$, and countup circuit 83 is energized to advance the value in register 63 to $Y+1$.

When lead $P_2'$ is energized, top of aperture register 29 is reset to 47 and the value 47—$N$ from subtractor 69 is coupled through an AND gate 89 and OR gate 86 to top of mask register 30. The resulting field transfer operation completes the transfer of the data from cell X.

When lead $P_3'$ is energized, the value 47—$N$ is coupled from subtractor 69 through an AND gate 90 and OR gate 84 to top of aperture register 29 and top of mask register 30 is reset to zero. The address value of cell $X+1$ is also coupled from register 61 through AND gate 80 to the computer memory so the word in cell $X+1$ in the computer memory is read into register 1. The resulting field transfer operation fills the digit places in register 2. Accordingly, the address value of cell $Y+1$ is coupled from register 63 through AND gate 81 to the computer memory so the contents of register 2 are loaded into cell $Y+1$ of the computer memory. Thereafter countup circuit 82 is energized to advance the address value in register 61 to $X+2$, and countup circuit 83 is energized to advance the address value in register 63 to $Y+2$.

When lead $P_4'$ is energized, top of aperture register 29 is reset to 47 and the value $47-N$ is coupled from subtractor 69 through AND gate 89 and OR gate 86 to top of mask register 30. In addition, the address value of cell $Y+2$ is coupled through AND gate 79 to the computer memory so the word in cell $Y+2$ is read into register 2. Then a field transfer operation takes place that completes the transfer of data from cell $X+1$.

When lead $P_5'$ is energized, the value $47-N$ is coupled from subtractor 69 through AND gate 90 and OR gate 84 to top of aperture register 29 and the value $D_R$ is coupled from register 64 through AND gate 88 and OR gate 86 to top of mask register 30. The address value of cell $X+2$ in register 61 is also coupled through AND gate 80 to the computer memory so the word in cell $X+2$ is read into register 1. Then a field transfer operation takes place that completes the transfer of data to be stored in cell $Y+2$. Finally the address value of cell $Y+2$ in register 63 is coupled through AND gate 81 to the computer memory so the contents of register 2 are loaded into cell $Y+2$ of the computer memory. This completes the transfer.

What is claimed is:

1. Apparatus for transferring a field of digital data in parallel from a first position within a row of digit places to a laterally displaced second position within the row, the field occupying fewer digit places than the number of digit places in the row, the apparatus comprising:
- means for specifying an arbitrary number of digit places that the field is to be displaced;
- a plurality of data transmission lines, each data transmission line corresponding to a respective one of the digit places in the row;
- a plurality of offset lines, each offset line corresponding to a respective one of the digit places in the row;
- means responsive to the specifying means for coupling the data transmission lines to the offset lines such that the data transmission lines corresponding to the digit places of the first position are respectively coupled to the offset lines corresponding to the digit places of the second position; and
- means for masking off those offset lines corresponding to the digit places of the row that are outside of the second position.

2. The apparatus of claim 1, in which the means for coupling comprises a matrix of AND gates electrically arranged in a number of columns equal to the number of data transmission lines and the same number of rows, wherein each AND gate has at least two inputs and wherein each data transmission line is coupled to a first one of the inputs of each AND gate in one column, and further comprises means for simultaneously enabling a second one of the inputs of all of the AND gates in one row of the matrix, and means for coupling the outputs of the AND gates in each row to a respective one of the offset lines.

3. The apparatus of claim 2, in which the means for simultaneously enabling the AND gates comprises an offset register having a number of selection lines equal to the number of data transmission lines, means for coupling each selection line to the AND gates in respective rows of the matrix, and means responsive to the offset register for energizing one selection line at a time.

4. The apparatus of claim 1, in which the means for masking comprises a plurality of transmission gates, the number of transmission gates being equal to the number of offset lines, wherein the transmission gates have at least first and second inputs with the first inputs coupled to respective offset lines, and further comprises means for supplying an inhibit signal to the second input of those transmission gates that have an input coupled to the respective offset lines corresponding to those digit places of the row that are outside of the second position, whereby the inhibit signals that are coupled to the inputs of the transmission gates inhibit transmission therethrough.

5. The apparatus of claim 4, in which a top aperture register is provided for storing a first value designating the digit place of one boundary of the second position, a top of mask register is provided for storing a second value less than the first value, which second value designates the digit place of the other boundary of the second position, and the means for supplying an inhibit signal supplies an inhibit signal to each transmission gate that has an input coupled to an offset line corresponding to each digit place that lies in significance both greater than the top of aperture value and less than the top of mask value.

6. The apparatus of claim 4, in which a top of aperture register is provided for storing a value designating the digit place of one boundary of the second position, a top of mask register is provided for storing a value designating the digit place of the other boundary of the second position, the top of mask value being at least as great as the top of aperture value, and the means for supplying an inhibit signal supplies an inhibit signal to each transmission gate that has an input coupled to an offset line corresponding to each digit place that lies in significance whether less than the top of aperture value or greater than the top of mask value.

7. Apparatus for transferring a field of binary valued data signals, the apparatus comprising:
- a source register having at least as many digit places as the field to be transferred;
- a destination register having as many digit places as the source register;
- an offset network for laterally displacing the binary values of the field any one of a number of digit places equal to the number of digit places in the source register;
- a group of lines for coupling the source register to the offset network, the number of lines in the group being equal to the number of digit places in the source register;
- a masking network for coupling the offset network to the destination register such that only the binary valued data signals occupying the digit places within the field are transmitted to the destination register.

8. Apparatus for transferring data from a source field occupying adjacent parts of cells X and $X+1$ in a memory to a destination field occupying a cell Y in the memory, the boundary of the source field in cell X being an arbitrary digit place $S_L$, one boundary of the destination field in cell Y being any arbitrary digit place $D_L$ that is greater than $S_L$, the other boundary of the destination field in cell Y being the least significant digit place in cell Y, and the cells in the memory having P digit places, the apparatus comprising:
- a storage register having P digit places;
- means for transferring the contents of cell Y to the storage register;
- first means for transferring the data in the least significant digit place through the arbitrary digit place $S_L$ in cell X to digit places $(D_L-S_L)+1$ through $D_L$ in the storage register;
- second means for transferring the data in the most significant digit place through digit place $P-(D_L-S_L)$ in cell $X+1$ to the least significant digit place through digit place $(D_L-S_L)$ in the storage register; and
- means for transferring the contents of the storage register to cell Y after both the first and second means have effected a transfer.

9. Apparatus for transferring data from a source field occupying a cell X in a memory to a destination field occupying adjacent parts of cells Y and $Y+1$ in the memory, the boundary of the destination field in cell Y being an arbitrary digit place $D_L$, one boundary of the source field in cell X being an arbitrary digit place $S_L$ that is greater than $D_L$, the other boundary of the source field in cell X being the least significant digit place in cell X, and the cells in the memory having P digit places, the apparatus comprising:

- a storage register having P digit places;
- means for transferring the contents of cell Y to the storage register;
- first means for transferring the data in digit places $(S_L-D_L)+1$ through the arbitrary digit place $S_L$ in cell X to the least significant digit place through digit place $D_L$ in the storage register;
- means for transferring the contents of the storage register to cell Y after the transfer by the first means;
- second means for transferring the data in the least significant digit place through digit place $(S_L-D_L)$ in cell X to digit place $P-(S_L-D_L)$ through the most significant digit place in the storage register; and
- means for transferring the contents of the storage register to cell $Y+1$ after the transfer by the second means.

10. Apparatus for transferring data from a source field occupying a cell X in a memory to a destination field occupying adjacent parts of cells Y and $Y+1$ in the memory, the boundary of the destination field in cell $Y+1$ being an arbitrary digit place $D_R$, one boundary of the source field in cell X being an arbitrary digit place $S_R$, that is less than $D_R$, and the other boundary of the source field in cell X being the most significant digit place in cell X, and the cells in the memory having P digit places, the apparatus comprising:

- a storage register having P digit places;
- first means for transferring the data in the arbitrary digit places $S_R$ through $P+(S_R-D_R)$ in cell X to digit place $D_R$ through the most significant digit place in the storage register;
- means for transferring the contents of the storage register to cell Y and transferring the contents of cell $Y+1$ to the storage register after the transfer by the first means;
- second means for transferring the data in digit place $P+(S_R-D_R)+1$ through the most significant digit place in cell X to the least significant digit place through digit place $(D_R-S_R)$ in the storage register; and
- means for transferring the contents of the storage register to cell $Y+1$ after the transfer by the first means.

11. Data handling apparatus for selecting from an ordered set of input data signals a field specified by field selection signals and shifting the order of the signals within the selected field by an amount specified by shift control signals, the apparatus comprising:

- an offset control circuit having a first plurality of input lines for accepting the input data signals, a second plurality of input lines for accepting the shift control signals, a plurality of coupling lines, and having means responsive to the input data signals and to the shift control signals for producing on the coupling lines an ordered set of signals rotated in order from the order of the input data signals by the amount specified by the shift control signals; and
- a mask network having a plurality of output lines and having means responsive to the field selection signals and to the ordered set of signals for transmitting to the output lines the signals of the field specified by the field selection signals and for masking the transmission to the output lines of the unselected signals.

12. In a data handling system that handles information units that each comprise a plurality of ordered binary valued signals, in which the order accorded to each binary valued signal included within an information unit when the information unit is carried by a plurality of data transmission lines depends upon a predetermined order ascribed to the data transmission line carrying the binary valued signal; apparatus for simultaneously transferring binary valued signals that compose a field within an input information unit from a first plurality of data transmission lines carrying the input information unit to a second plurality of data transmission lines, the apparatus comprising:

- a plurality of transmission lines for carrying masking signals that specify which of the binary valued signals of the input information unit are to compose the field to be transferred;
- a plurality of transmission lines for carrying offset control signals that specify an amount by which the binary valued signals transferred to the second plurality of data transmission lines are to be rotated in order from their order in the input information unit; and
- means responsive to the input information unit, to the masking signals, and to the offset control signals for simultaneously causing the respective transfer of each of the binary valued signals within the field specified by the masking signals to each of those data transmission lines of the second plurality of data transmission lines that are ascribed an order different from the order of the data transmission lines of the first plurality of data transmission lines carrying the input information unit by the amount specified by the offset control signals and for inhibiting the transfer to the second plurality of data transmission lines of the binary valued signals of the input information unit without the field specified to be transferred.

13. Apparatus for transferring data from a source field occupying adjacent parts of cells X and $X+1$ in a memory to a destination field occupying a cell Y in the memory, the boundary of the source field in cell $X+1$ being an arbitrary digit place $S_R$, one boundary of the destination field in cell Y being an arbitrary digit place $D_R$ that is less than $S_R$, the other boundary of the destination field in cell Y being the most significant digit place in cell Y, and the cells in the memory having P digit places, the apparatus comprising:

- a storage register having P digit places;
- means for transferring the contents of cell Y to the storage register;
- first means for transferring the data in the least significant digit place through the arbitrary digit place $(S_R-D_R)$ in cell X to digit place $P-(S_R-D_R)+1$ through the most significant digit place in the storage register;
- second means for transferring the data in the arbitrary digit place $S_R$ through the most significant digit place in cell $X+1$ to digit places $P-(S_R-D_R)$ through $D_R$ in the storage register; and
- means for transferring the contents of the storage register to cell C after both the first and second means have effected a transfer.

References Cited

UNITED STATES PATENTS

| | | | |
|---|---|---|---|
| 3,076,181 | 1/1963 | Newhouse et al. | 340—174 |
| 3,109,162 | 10/1963 | Wolensky | 340—172.5 |
| 3,350,692 | 10/1967 | Cagle et al. | 340—172.5 |
| 3,371,320 | 2/1968 | Lachenmayer | 340—172.5 |
| 3,436,737 | 4/1969 | Iverson et al. | 340—172.5 |

PAUL J. HENON, Primary Examiner

M. B. CHAPNICK, Assistant Examiner

PO-1050
(5/69)

UNITED STATES PATENT OFFICE
CERTIFICATE OF CORRECTION

Patent No. 3,553,652 Dated January 5, 1971

Inventor(s) Lawrence G. Hanson

It is certified that error appears in the above-identified patent and that said Letters Patent are hereby corrected as shown below:

IN THE SPECIFICATION:

Column 4, line 12, "gates 25" should be --gates 25 to--

Line 59, "register 29" should be --registers 29--

Column 5, line 57, "cell X." should be --cell X,--

IN THE CLAIMS:

Claim 5, column 10, line 4, "top aperture" should be --top of aperture--

Claim 13, column 12, line 57, "C" should be --Y--

Signed and sealed this 29th day of June 1971.

(SEAL)
Attest:

EDWARD M.FLETCHER,JR.
Attesting Officer

WILLIAM E. SCHUYLER, JR.
Commissioner of Patents